April 10, 1956  R. KAGAN ET AL  2,741,310
BIAS CUTTING MACHINE
Filed March 2, 1954  6 Sheets-Sheet 1

INVENTORS
RALPH KAGAN
EDWARD R. JOHNSON.
BY
Robert J. Hulsizer
ATTORNEY

April 10, 1956

R. KAGAN ET AL 2,741,310

BIAS CUTTING MACHINE

Filed March 2, 1954

INVENTORS
RALPH KAGAN
EDWARD R. JOHNSON
BY
Robert I. Hulsizer.
ATTORNEY

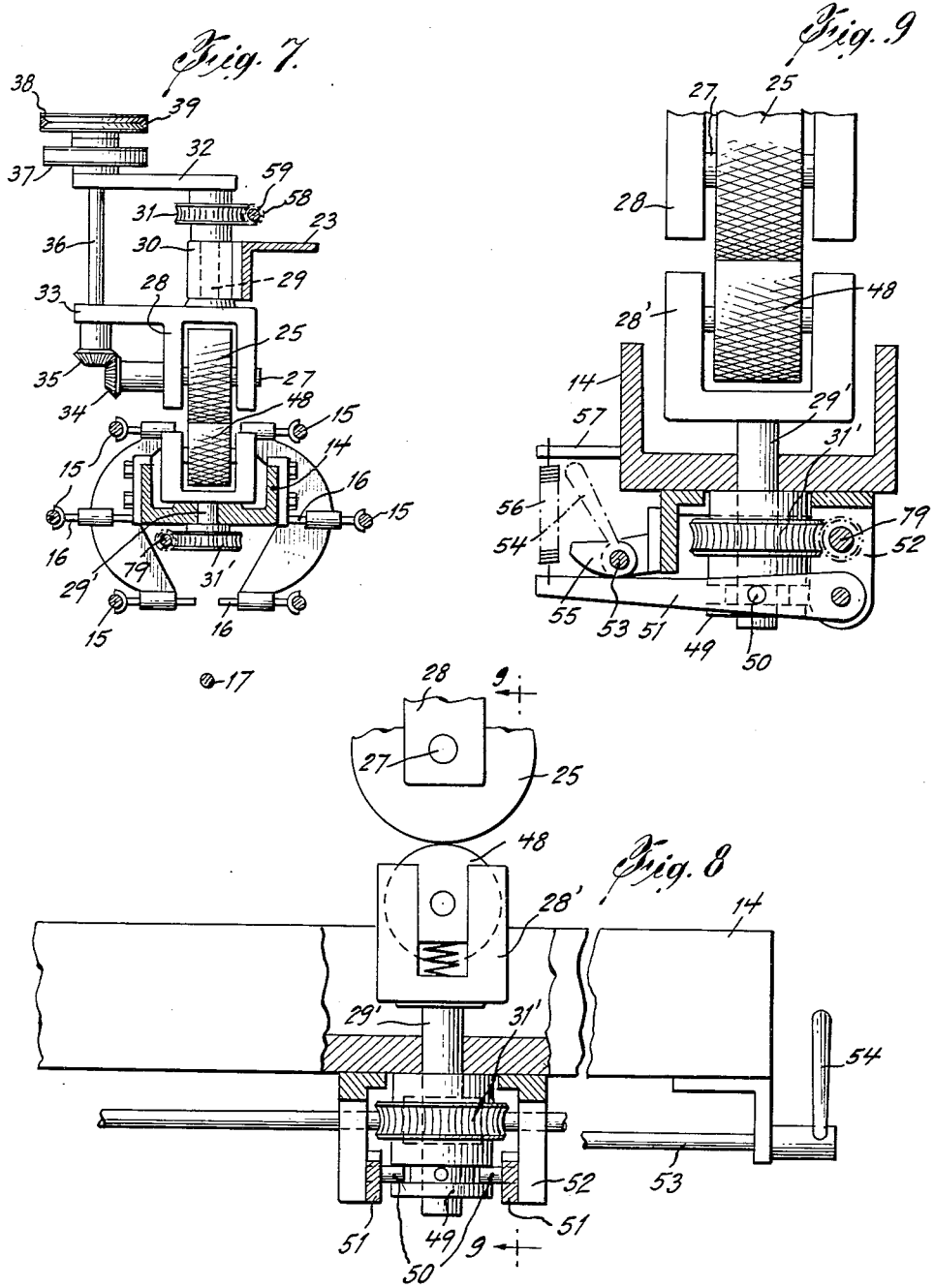

April 10, 1956 R. KAGAN ET AL 2,741,310
BIAS CUTTING MACHINE
Filed March 2, 1954 6 Sheets-Sheet 6
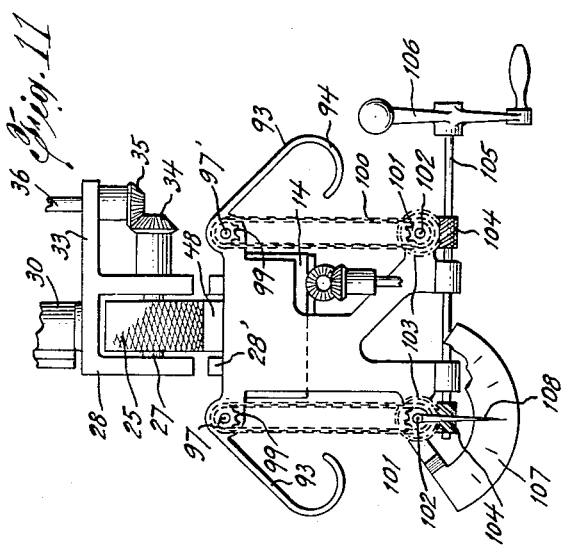
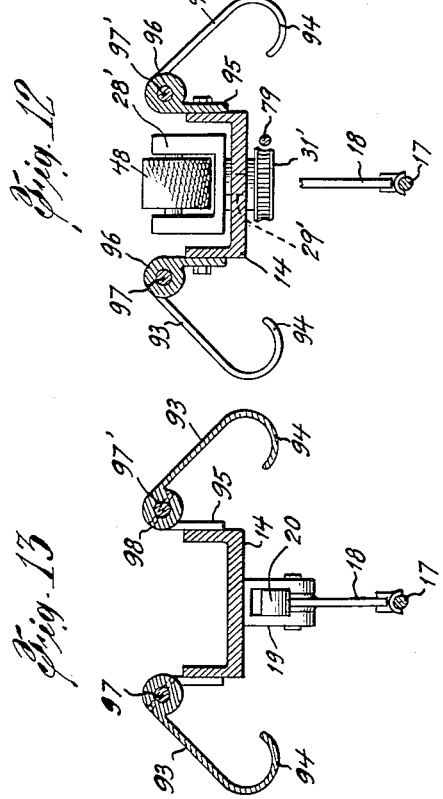
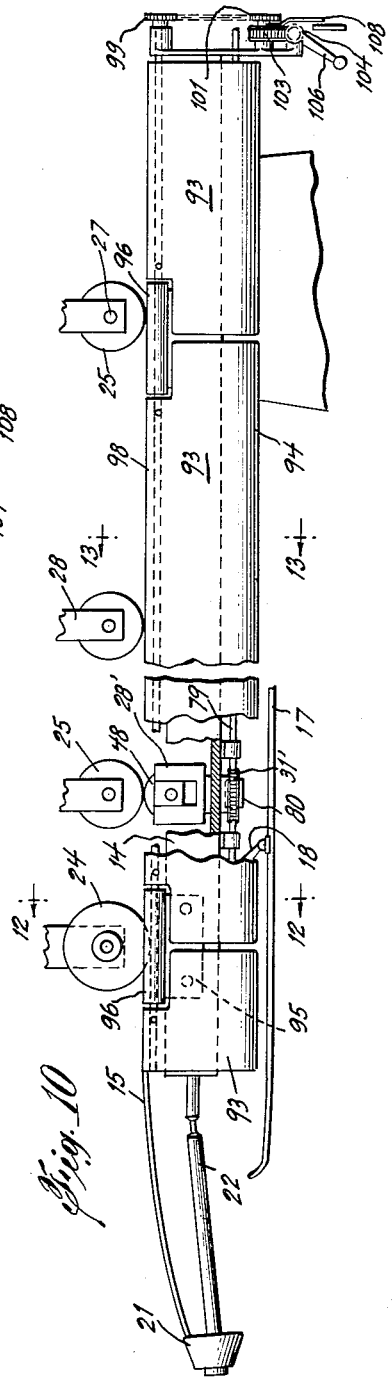
INVENTORS
RALPH KAGAN
EDWARD R. JOHNSON
BY
Robert J. Hulsizer
ATTORNEY

United States Patent Office 2,741,310
Patented Apr. 10, 1956

2,741,310

BIAS CUTTING MACHINE

Ralph Kagan, Brooklyn, and Edward R. Johnson, Valley Stream, N. Y., assignors to Bias Cloth Machine Co., Inc., New York, N. Y., a corporation of New York Application March 2, 1954, Serial No. 413,526

4 Claims. (Cl. 164—61)

This invention relates to new and useful improvements in bias cutting machines and in the bias industry a need has long been felt for a simplified bias cutting unit adapted to the cutting of various materials having inherent peculiarities of which velvet, net, fine lawn, fine rayons, and silks are characteristic examples. Such materials do not lend themselves readily to easy processing into bias cloth in the regular well known machines now in use due to these peculiarities such as weave and finish which necessitate different bias angles in order to make them best suitable for various uses. Furthermore there is no machine now on the market which permits cutting almost any material on the bias with the widest possible range in the bias angle with the material passing spirally around the mandrel to the right or to the left. No machine combines these features with the ability to instantly adjust the feed rollers and the cutting knife over a wide range of angles. No machine further combines additionally means to pull the material either by rollers on the mandrel or by means of a wind-up device either used as part of the machine or as a separate unit. In effect this machine is really one unit which combines the capacities of several different uses so that a purchaser of this machine can do practically any kind of bias work which formerly would require several separate units.

A main object of this invention is to provide a simplified bias-cutting machine for cutting regular bias cloth but which can also be used for cutting over a wide range of bias angle at will and by rapid and easy manipulations to suit the required condition of the particular cloth being cut.

It is also felt that a smaller machine, occupying a minimum floor area is highly desirable, since such saving is of great importance to the user since many of the bias cutting houses do not have sufficient space to use the regular bias machines now on the market. Therefore it is another object of this invention to provide a simple, compact machine which can achieve a wide variety of operations and yet occupy a small space with the consequent saving in floor space and rent and permit a given area of floor space to be used to more advantage than before.

It has also been found that, with the above mentioned peculiar materials, their inherent properties may vary so much that a clock-wise cut is of advantage with one material, whereas a counter-clockwise cut will be of advantage with other materials. Therefore it is still another object to provide a simple and efficient machine in which the parts may be quickly and easily changed for the purpose of gaining an advantage from bias cloth cut in either direction. In the bias-cutting industry at the present time, the machines in use are either limited to the angle of adjustment for the bias cut due to their construction or the change in the angle would involve mechanical change which consumes considerable time. Other machines on the market have rollers on a mandrel adjustable for the change of bias angle but are so arranged around the mandrel that one or more of the rollers are in a position to contact with the material before it is cut on the bias, in which case the rollers so situated not only pull the material after cutting but also push the material before it is cut, which latter action is most always objectionable and weakens the control over the material which is so essential to a smooth even flow of material and a smooth and even bias cutting action.

Still another object is to provide an improved form of mandrel which can by a simple manipulation be adjusted to adapt the machine for any diameter of the mandrel desired for cloths of different widths or for varied angles of cut.

Yet another object is to provide a simple means whereby a single manipulation will disconnect the feed of the material from the rollers on the mandrel to a wind-up mechanism which may be part of the machine or a separate adjacent wind-up unit to effect the pulling of the material over and around the mandrel.

Further and more specific objects, features, and advantages will more clearly appear from a consideration of the detailed specification hereinafter set forth, especially when taken in connection with the accompanying drawings which illustrate a present preferred form which the invention may assume and which form part of the specification.

This application is a continuation in part of our pending application Serial Number 268,494, filed January 28, 1952 in Division 57 and entitled Bias Cutting Machine, now abandoned.

In brief and general terms, the invention includes a floor pedestal frame on which is mounted a horizontal supporting beam. On this beam in one form, is disposed a series of longitudinally extending mandrel bars adjustably mounted to vary their distance from their common center. In another form of mandrel there are a plurality of curved plates on each side of the machine over which the material flows and which can be adjustable to suit the character and size of the material being cut and by a simple turning of a crank handle. The material to be cut is tubular in form and passes on to and around the mandrel in a spiral direction from a rotatable box swivel such as is shown in U. S. Patent No. 2,128,481 issued August 30, 1938 to F. Gerstein et al. and entitled "Bias Cutting and Wind-Up Apparatus." From this box the tubular material flows or is drawn as the box is turned and passes on to and around the mandrel at any desired angle.

Mounted on a frame structure above the mandrel supporting beam is a bias-cutting knife and a series of driven rollers disposed to engage the material as it passes around the mandrel. The driven rollers are associated with idle rollers disposed on the beam and engaging the under side of the material. The driven rollers are actuated by a single motor and the knife by a separate motor. The knife and the driven and the idle rollers are all adjustable and by a single means preferably in the form of a crank handle through common connections.

While in the preferred form of the machine the material is pulled from the swivel box by the rollers on the mandrel, this machine is adapted to disable the idle rollers so that they do not engage the material and cooperate with the driven rollers. In this case the material may be pulled over and around the mandrel by a wind-up means which may be an integral part of the machine or a separate device. In the first case the wind-up means, such as a roller, may be driven by the same means which drives the driven rollers and may be adjusted angularly as they are and simultaneously therewith as will be described.

Thus there has been provided a machine which is in reality several machines in one. It can cut any kind of material on the bias and at the widest possible range of bias angles. The rollers and the cutting knife are set in any desired angle simultaneously and in synchronism by merely turning a crank, so that the material may be cut at any desired angle but also may be moved around the mandrel in one or the other direction as the case may require. If desired a modified form of mandrel is provided which is made mainly of curved adjustable plates extending longitudinally along the sides of the beam and adjustable at any desired angle by a single crank operation. Also by a single operating means the idle rollers may be disabled as and for the purposes above set forth. In contrast to previous means for adjusting rollers, and setting mandrel elements and the like, this machine can accomplish these vital alterations in a matter of seconds thus saving very much time and increasing the output capacity of the machine not to mention its wide adaptability as to uses to which it may be put.

The present preferred form which the invention may assume is illustrated in the drawings, of which, Figures 1 and 2, taken together represent a side elevation of the machine;

Fig. 6 is a vertical cross section taken on the line 6—6 of Fig. 2;

Fig. 7 is a vertical cross section on the line 7—7 of Fig. 1;

Fig. 8 is a partial side elevation, broken away, showing the means for disabling the idle rollers;

Fig. 9 is an end section taken on the line 9—9 of Fig. 8;

Fig. 10 is a somewhat general side elevation of an improved form of mandrel;

Fig. 11 is an end elevation of the form shown in Fig. 10, looking from the right of Fig. 10;

Fig. 12 is a cross section taken on the line 12—12 of Fig. 10; and

Fig. 13 is a similar view taken on the line 13—13 of Fig. 10.

Figure 1:
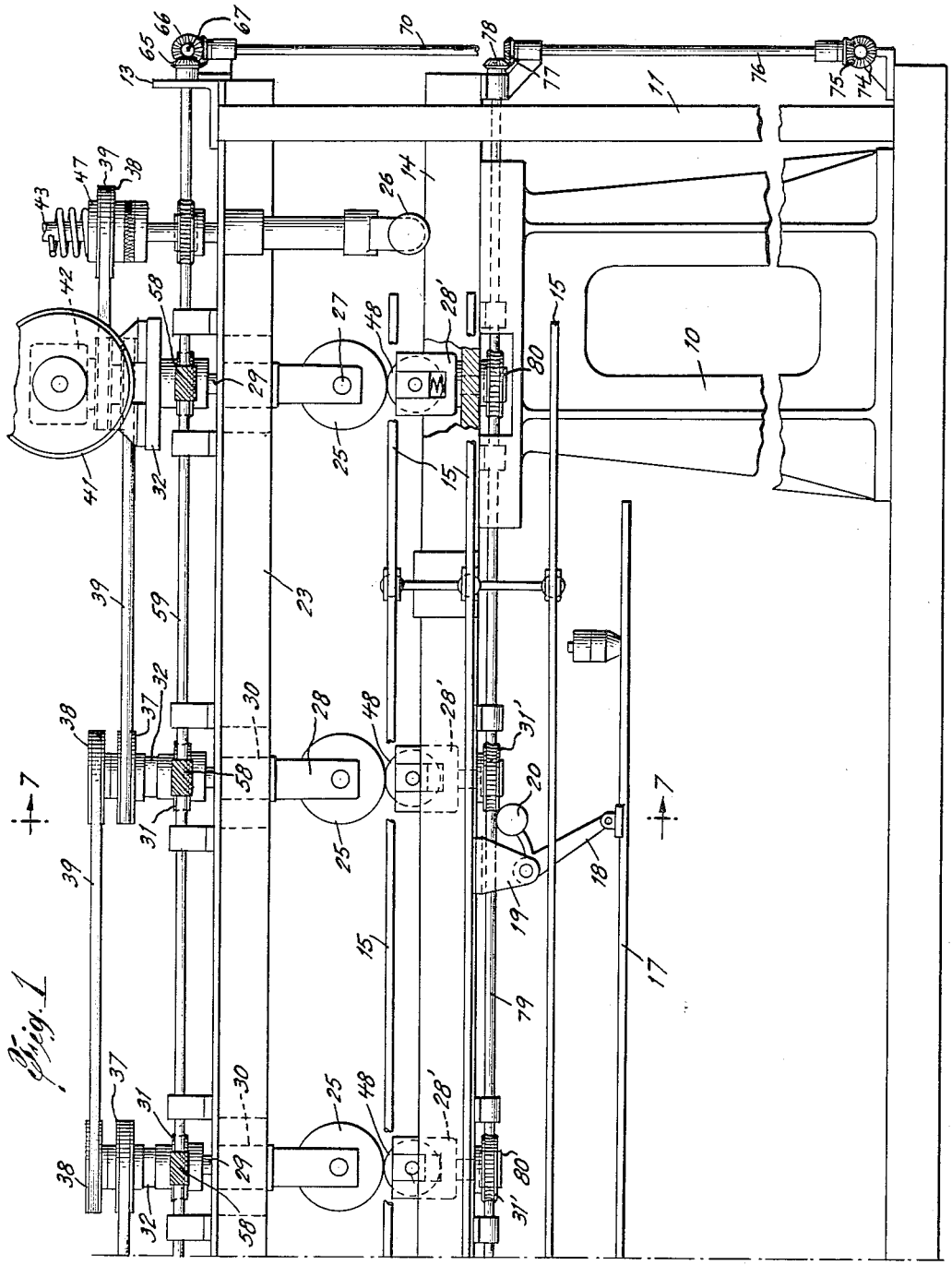
Figure 2:
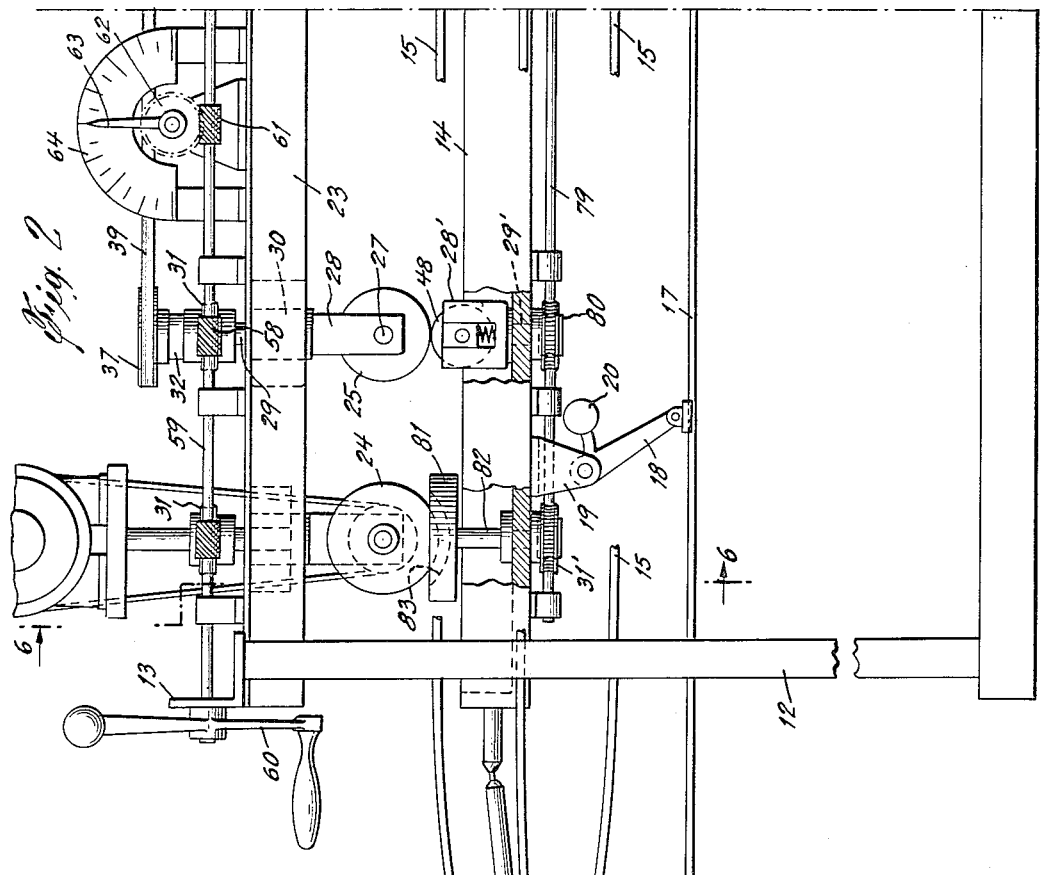

Referring now merely to the present preferred forms which the invention may assume and as illustrated herein, the machine is mounted from the floor on pedestal and vertical frame members 10, 11, and 12. The tops of elements 11 and 12 are cross connected by beams 13 or channel bars (Figs. 1 and 2). From the top of the pedestal members 10 a heavy beam, preferably U-shaped, 14 extends horizontally forward and acts as a support for a mandrel comprised of a series of elongate bars 15 extending longitudinally alongside the beam 14 in a generally curved or circular configuration (Fig. 6) and are adjustably supported therefrom by any suitable means such as adjustable spacer rods 16. The lowermost mandrel bar 17 is supported along its length by arms 18 pivoted to brackets 19 dependent from the beam 14 and counterbalanced by weights 20 so that they tend to always move downward except when urged upwardly by the pressure of the goods passing around the mandrel bars. This tends to keep a more or less constant tension in the goods so passing. The forward ends of the mandrel bars 15 are curved toward each other as shown in Fig. 2, and lie within a cap member 21 supported from the beam 14 by an extending bar 22. In operation with this form of mandrel the material will pass from a rotatable swivel box (not shown) in tubular form and over this narrowed end of the mandrel in a spiral manner, as indicated in the above mentioned patent.

Disposed above the mandrel structure and parallel therewith is a structural element in the form of a beam 23. Suspended above the mandrel from this beam 23 are a cutting knife 24 and four driven material engaging rollers 25, and a wind-up roll 26 (see Figs. 1 and 3). Each driven roller 25 is mounted with its shaft 27 horizontally journalled in a rotatable frame 28. The frame 28 has at the top a vertical stub shaft 29 passing through a bushing 30 on the beam. To this stub shaft is connected a worm gear 31 and on the top of the shaft 29 is a laterally extending plate 32 which extends in the same direction laterally as an extension 33 on the top of the rotatable frame 28. The shaft 27 beneath the extension 33 has on its end a bevel gear 34 meshing with a bevel gear 35 on a vertical shaft 36 journalled in the plates 32 and 33 and extending therebetween. On its upper end above the plate 32 the shaft 36 has two belt pulleys 37 and 38. The last shaft 36 to the left in Fig. 2 obviously only needs one pulley such as 37 shown.

Figure 3:
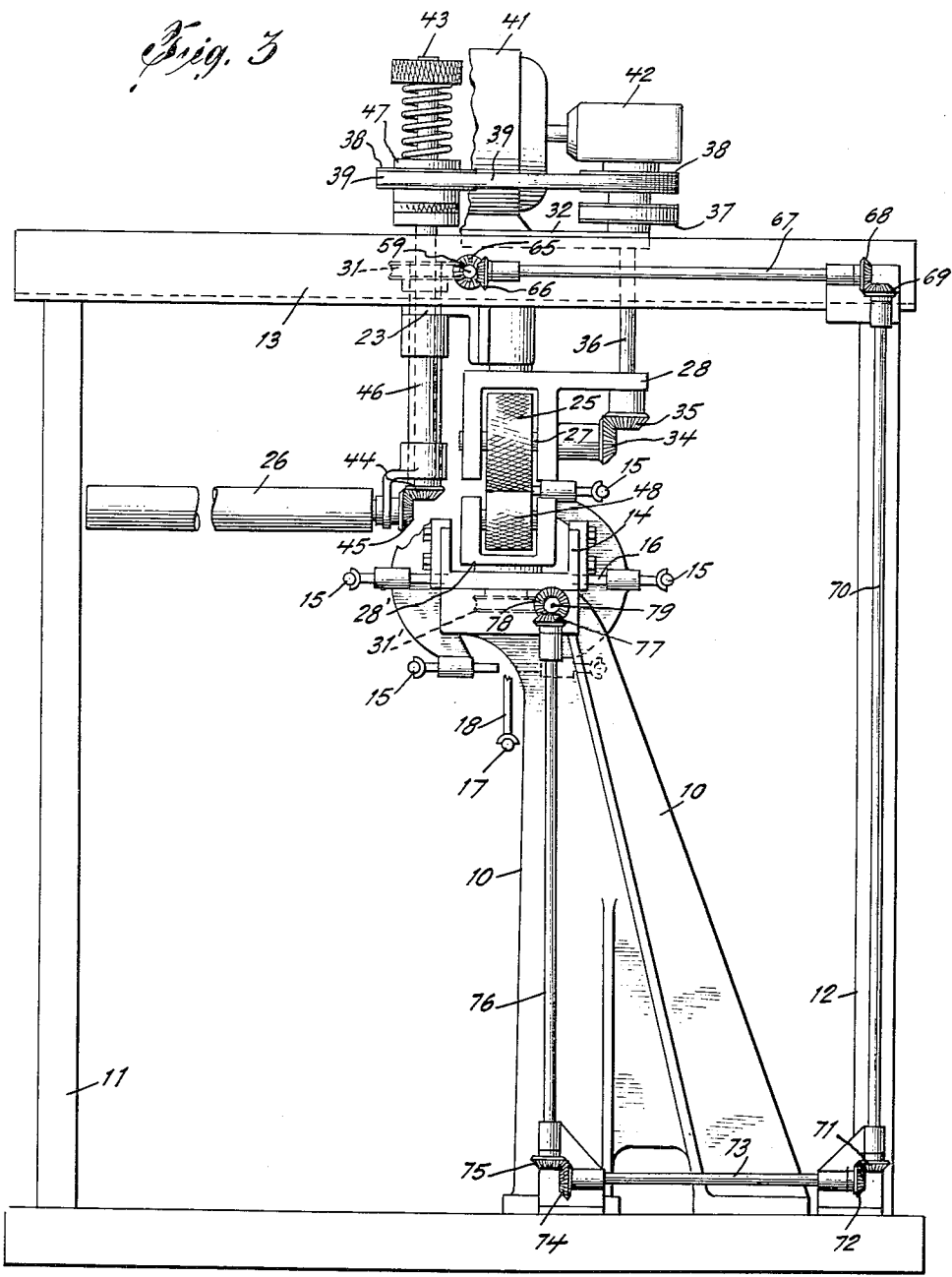
Fig. 3 is an end elevation of the machine looking from the right in Fig. 1.

These pulleys are driven by and connected by belts 39. On top of the stub shaft 29 of the most right hand roller 25 in Fig. 1 is mounted a plate 32 supporting the motor 41 the shaft of which is connected to a gear box 42 containing bevel gears (not shown) for driving one of the shafts 36 connected to the frame 28 supporting one of the rollers 25. This motor is shown, through belts 39 and pulleys 37 and 38, drives all the rest of the rollers 25. The motor 41 also drives, through a belt 39, a pulley 38 on a shaft 43 the lower end of which supports a bevel gear 44 meshing with a bevel gear 45 which supports a wind-up roller 26. This assemblage is supported on a tubular bracket member 46 connected to the beam 23 (Fig. 3). A slip clutch including a spring pressed disc 47 allows the pulley 38 to slip with respect to the shaft 43 when necessary.

Related to the rollers 25 which engage and pull the material over and around the mandrel are a respective series of lower rollers 48 which are supported in frames 28' having a dependent stub shaft 29' extending through the bottom of the U beam 14 in which the frames 28' are disposed. Each stub shaft 29' has thereon a worm gear 31' and on its lower end an annularly slotted collar 49 into which slot extends a pin 50 on arm 51 pivoted to a bracket plate 52 connected to the lower face of the beam 14 (Fig. 9). Each lower idler roller 48 is provided with this group of elements whereby it can be lowered away from the material so that the upper drive rollers 25, with which they usually cooperate in gripping the material therebetween, cannot drive the material. This function of releasing the material from the pull of the rollers 25 is for a purpose later to be mentioned. On the bracket 52 adjacent each roller 48 is a shaft 53 which extends along the several brackets 52 and has on its end a crank arm 54. Adjacent each shaft 29' the shaft 53 has connected thereto an elongate cam arm 55 adapted to engage the end of the lever 51 above mentioned. A spring 56 connected to the end of lever 51 and to a pin 57 on the side of the U beam 14 tends to hold the arm 51 up against the cam arm 55. Counter-clockwise movement of the arm 54 (Fig. 9) will force lever 51 down and effect the lowering of the idler rollers 48. This will effect the lowering of all such rollers at the same time when desired.

In order to turn the mountings of the upper and lower rollers and the wind-up roller so that they may be disposed in parallel relation to each other no matter what angle they may assume with respect to the axis of the mandrel, each of the said mountings, such as the tubular bracket member 46, the stub shafts 29 and 29' are provided with worm gears 31 and 31' respectively fixed thereon. Each of the gears 31 above the beam 23 is engaged by a worm 58 on a long shaft 59 which extends along the top and at the left end (Fig. 2) is turned by a crank handle 60. Midway the shaft is another worm 61 meshing with a worm gear 62 on which is a pointer 63 movable over a dial 64 mounted on top of the beam 23 to indicate the angular position of the parts so moved. The shaft 59 is journalled in bracket plates 13 at each end and at the right end has a bevel gear 65 meshing with a bevel gear 66 on a horizontal shaft 67 on the other end of which is a bevel gear 68 meshing with a bevel gear 69 on a vertical shaft 70 (Fig. 3) the lower end of which has a bevel gear 71 meshing with a bevel gear 72 on a horizontal shaft 73. The other end of shaft 73 has a bevel gear 74 meshing with a bevel gear 75 on a vertical shaft 76. The upper end of shaft 76 has a bevel gear 77 meshing with a bevel gear 78 on a horizontal shaft 79 extending and supported from and below the lower beam 14 and adapted to mesh with the lower worm gears 31' through worms 80 (Fig. 1). These engagements turn the lower idler rollers 48 as well as the lower guide block 81 turnable on shaft 82 and having its worm gear 31' at the bottom thereof. The top of the block 81 has a curved groove 83 therein to receive the knife 24 and is turned in synchronism with the knife and this arrangement facilitates the movement of the cloth beneath the knife and keeps the cut edge smooth and even at this point.

Figure 4:
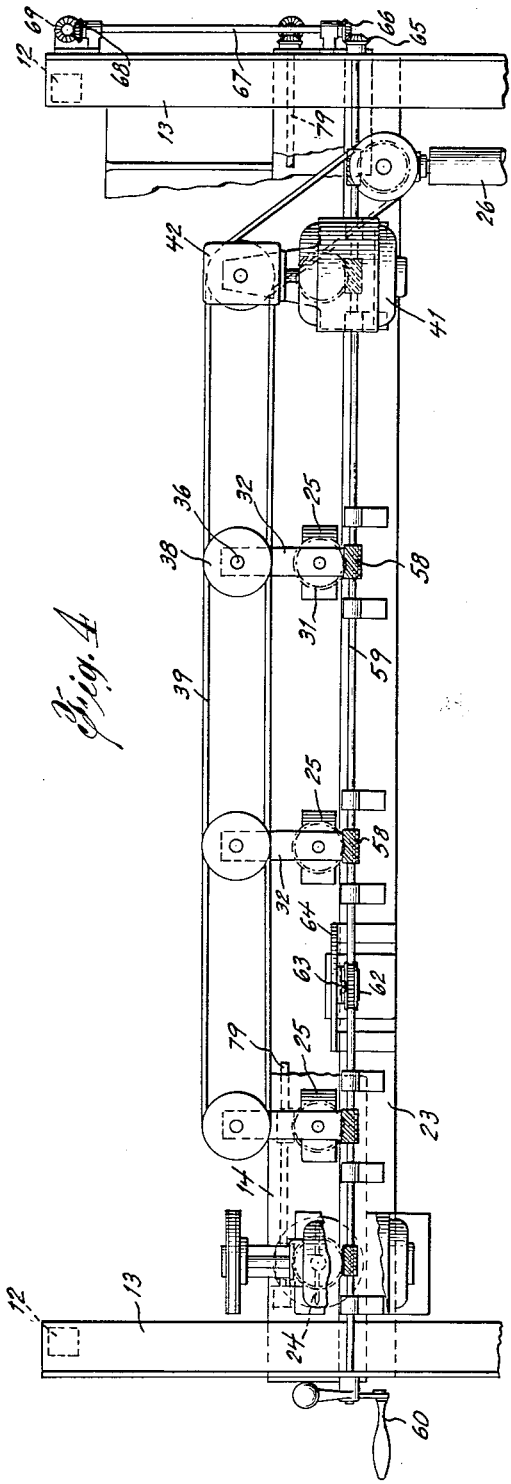
Fig. 4 is a partial plan view of the machine.
Figure 5:
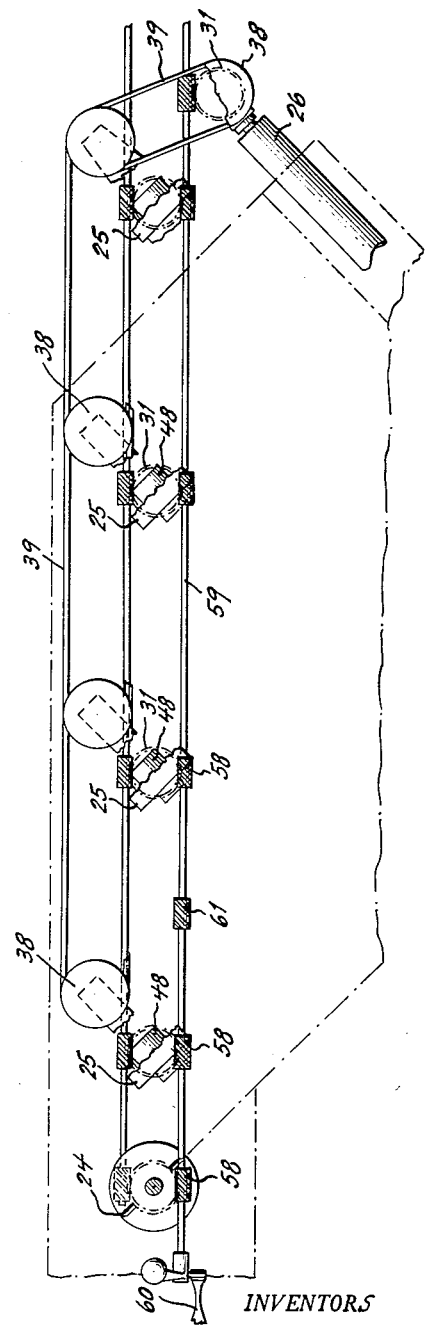
Fig. 5 is a similar view showing the parts in position to move the material angularly over the mandrel.

The knife 24 is mounted on a horizontal shaft 84 journalled in a rotatable frame 85 and has a pulley thereon 86 over which runs a belt 87 engaging with a pulley 88 on the horizontal shaft 89 of a motor 90 mounted on a support plate 91. The plate 91 is supported on a rotatable shaft 92 which is co-axial with the shaft 82 supporting the knife block 81 (Fig. 6). This shaft 92 has thereon one of the worm gears 31 meshing with one of the worms 58 on shaft 59 and is turned with the shaft by handle 60. In Fig. 4 the parts are shown in a normal position with the axes of the knife and rollers (both upper and lower) and the wind-up roller disposed at right angles to the longitudinal axis of the mandrel. In Fig. 5 the parts are shown after the crank 60 has been turned to adjust these axes at an angle to the axis of the mandrel and the flow of the material over and around the mandrel in this adjusted position of the parts is shown in dot and dash lines. These views are somewhat schematic.

In somewhat general views shown in Figs. 10 to 13 inclusive, there is shown a modified form of mandrel in which the bars 15 and the cap 21 have been retained at the front of the mandrel as well as the lower gravity-operated bar 17. However, over the remainder of the mandrel length there has in this form been substituted longitudinally extending curved swingable plates 93 which have rather flat sides with reversely curved lower edges 94. Preferably there are several of these plates disposed on each side of the mandrel along the length thereof but there may be only one used if desired and extending the same longitudinal length as the several shown. Fastened to the sides of the beam 14 are brackets 95 supporting bushings 96 which support shafts 97 and 97' extending along the sides of the beam. The plates 93 have sleeves 98 through which the shafts extend. At the right end of these shafts (Fig. 10) are gears 99 over which run chains 100 engaging gears 101 on shafts 102 also supporting worm gears 103. These worm gears 103 are engaged by worms 104 on a horizontal shaft 105 operated by a crank arm or handle 106. A dial 107 on the frame lies adjacent a pointer 108 on one of the shafts 102 so as to indicate the angle at which the mandrel plates 93 are disposed with respect to the horizontal.

From the above description of the structure of the present preferred form which the invention may assume, it is obvious that there has been presented in a single machine a multi-purpose unit the like of which has never been and is not now available to the public. By the use of this machine the user can cut material of most every character on the bias over a wide range of bias angles. He can cut the material thus whether it is desired to spiral it around the mandrel in one or the other direction. He can adjust the pull-away roller, and the knife all at once by the simple manipulation of a single crank arm whether the material is to move in one or the other direction. He can also adjust the wind-up roller with the above elements when the material is moving in a given direction depending upon which side the roller 26 is on. He can adjust the size of the mandrel by very simple manipulations and merely by the manipulation of a single crank arm in the form of mandrel shown in the latter figures of the drawing. If he wishes to dispense with the pull-away rollers he merely has to operate a single crank arm which will lower the idler rollers. In this case the material can be pulled over and around the mandrel by the wind-up roller or by a separate wind-up device if desired. Therefore the manufacturer who, hitherto has had to buy several machines to effect these various operations, can now purchase one machine to permit him to perform these several operations, thus saving much expense and cost of the extra floor space.

While the invention has been described in detail and with respect to a present preferred form thereof, it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What we claim, as our invention, is:

1. In a bias cutting machine, a horizontal mandrel comprising adjustable elements to change the effective diameter of the mandrel over and around which tubular material is adapted to be passed in a spiral manner, adjustable means engaging the material as it passes on to the mandrel to cut it on the bias, a plurality of adjustable means disposed at spaced points along the mandrel and beyond the cutting means and engaging the material to pull it over and around the mandrel in a predetermined direction, a wind-up roller disposed in and at right angles to the path of the material as it leaves the mandrel, said roller being adjustable at predetermined angles with respect to the axis of the mandrel, connections between the cutting means, the pulling means, and the wind-up roller, and a single manipulable means to operate said connections to adjust these elements at the same time and the same angle to the axis of the mandrel.

2. In a bias cutting machine, a horizontal mandrel over which material is to be passed in a spiral direction, a knife disposed above the mandrel to cut the material on the bias as it passes around the mandrel, a support for said knife, a slotted knife guide block disposed on the mandrel below the knife and having a slot to receive a lower portion of the lower area of the knife, the material adapted to pass across the top of the block whereby the material is more effectively and evenly cut by the knife, a support for the guide-block, a single means to adjust the knife support and the guide-block support simultaneously, a pair of material-engaging rollers mounted on a support for engaging the upper and lower faces of the material to pull it over and around the mandrel after it has been cut, a single means to adjust the angle of the rollers and the knife and its support-block simultaneously, a wind-up roller disposed on the mandrel and adjustable in and at right angles to the path of the material as it leaves the mandrel, and support for said wind-up roller, said last named support being adjusted by the same means which adjusts the angles of the pulling rollers and the knife.

3. In a bias cutting machine, a mandrel over which material is advanced in a spiral direction, upper and lower rollers engaging the upper and lower faces of the material respectively, means for driving the upper roller, a single means for adjusting simultaneously the angles of the two rollers with respect to the axis of the mandrel, and a wind-up roller on the mandrel disposeable in a position in and at right angles to the path of the material as it leaves the mandrel, said wind-up roller being adjustable by the same means which adjusts the pair of rollers.

4. In a bias cutting machine, a mandrel over which material is advanced in a spiral direction, upper and lower rollers engaging the upper and lower faces of the material respectively, means for driving the upper rollers, a single means for adjusting simultaneously the angles of the two rollers with respect to the axis of the mandrel, a cutting means disposed on the mandrel to engage and cut on the bias the material before it reaches the pulling rollers, said cutting means also adjustable by the same means which adjusts the pair of pulling rollers, and a wind-up roller on the mandrel disposeable in a position in and at right angles to the path of the material as it leaves the mandrel, said wind-up roller being adjustable also by the same means which adjusts the pair of rollers.

References Cited in the file of this patent

UNITED STATES PATENTS

| | | |
|---|---|---|
| 1,581,051 | Gardner | Apr. 13, 1926 |
| 1,643,157 | Gardner | Sept. 20, 1927 |
| 1,659,453 | Berry | Feb. 14, 1928 |
| 1,730,840 | Berry | Oct. 8, 1929 |
| 1,865,301 | Bunker | June 28, 1932 |
| 1,909,868 | Pearlman | May 16, 1933 |
| 1,955,282 | Gardner | Apr. 17, 1934 |
| 1,959,252 | Turner | May 15, 1934 |
| 2,291,707 | Gardner | Aug. 4, 1942 |
| 2,326,745 | Balk | Aug. 17, 1943 |
| 2,326,746 | Balk | Aug. 17, 1943 |
| 2,350,027 | Gardner | May 30, 1944 |
| 2,451,833 | Koch | Oct. 19, 1948 |
| 2,628,835 | Dickerman | Feb. 17, 1953 |
| 2,644,522 | Parker et al. | July 7, 1953 |